United States Patent [19]

Suzuki

[11] Patent Number: 5,210,456
[45] Date of Patent: May 11, 1993

[54] IMPACT SENSING DEVICE

[75] Inventor: Otohiko Suzuki, Tokyo, Japan

[73] Assignee: Takata Corporation, Tokyo, Japan

[21] Appl. No.: 818,566

[22] Filed: Jan. 9, 1992

[30] Foreign Application Priority Data

Feb. 4, 1991 [JP] Japan .................................. 3-013328

[51] Int. Cl.[5] .................................................. H01L 41/08
[52] U.S. Cl. .................................... 310/329; 310/339
[58] Field of Search ................. 310/329, 339; 367/160, 367/165, 180, 188; 73/517 R

[56] References Cited

U.S. PATENT DOCUMENTS

| | | | |
|---|---|---|---|
| 3,006,280 | 10/1961 | Rogers et al. | 310/329 X |
| 3,283,590 | 11/1966 | Shang | 310/329 X |
| 3,584,243 | 6/1971 | Fabian | 310/329 |
| 3,739,202 | 6/1973 | Cady | 310/329 |
| 3,911,388 | 10/1975 | Crump et al. | 310/329 X |
| 4,188,612 | 2/1980 | Kerr | 310/329 X |
| 4,326,275 | 4/1982 | Butler | 367/160 |
| 4,791,617 | 12/1988 | Seymour | 310/329 X |
| 4,839,872 | 6/1989 | Gragrolati et al. | 310/329 X |

FOREIGN PATENT DOCUMENTS 0316498A 11/1987 European Pat. Off. .
2242749A 4/1991 United Kingdom .

Primary Examiner—Mark O. Budd
Attorney, Agent, or Firm—Kanesaka and Takeuchi

[57] ABSTRACT

An impact sensing device including an inertia member, an housing for accommodating the inertia member therein and at least three impact sensors disposed in such a manner as to be in contact with an outer peripheral surface of the inertia member, each impact sensor comprising a piezoelectric element for generating a voltage having an amplitude corresponding to an applied stress and an urging member for urging the piezoelectric sensor against the inertia member. Upon application of an impact force to the impact sensor, the inertia member presses the piezoelectric element with a stress corresponding to the impact force to thereby allow the piezoelectric element to generate a voltage corresponding to the applied stress.

5 Claims, 3 Drawing Sheets

IMPACT SENSING DEVICE

BACKGROUND OF THE INVENTION

1. Field of the Invention

This invention relates to an impact sensor capable of detecting an impact direction, which is suitably used for a car air bag for protecting an occupant from impact due to a car clash, and also relates to an impact sensor suitable for a clash recording device which is capable of recording a clash situation when a car is damaged in a car clash.

2. Related Art

There has been recently propagated a car in which an air bag for protecting occupants such as a driver and so on from impact is installed. The air bag is so designed as to be inflated at the instantaneous time when the car suffers an impact which would damage an occupant body, and thus its operation is greatly dependent on performance of a sensor for detecting the impact. All impact sensors which have been hitherto developed are so designed as to detect an impact in a traveling-direction of a car, which includes a longitudinal (long-axial) direction of the car and a direction within 30 degrees at a left or right side with respect to the longitudinal direction.

Accordingly, a conventional impact sensor can not accurately detect the impact strength and impact direction of a car clash in a width (short-axial) direction of the car or in any direction of other arbitrary angle. This restriction in the detection accuracy is caused by the restriction in an installing position of the air bag, that is, because the installing position of the air bag is restricted to an handle or a front panel. However, it is expected that in the near future an air bag will be installed at a side of the car to protect the occupant from a car clash in the side direction of the car, and thus it is clear that an impact sensor capable of sensing an impact in all directions; that is, an omnidirectional impact sensor; will be required.

OBJECT AND SUMMARY OF THE INVENTION

An object of this invention is to provide an omnidirectional impact sensing device.

In order to attain the above object, an impact sensing device according to this invention is characterized by comprising a piezoelectric element type of impact sensor including an inertia member, and a housing for accommodating the inertia member therein. In the invention at least three impact sensors are disposed so as to be in contact with an outer peripheral surface of the inertia member, each impact sensor comprising a piezoelectric element for generating a voltage having an amplitude corresponding to an applied stress and an urging member for urging the piezoelectric sensor against the inertia member. Upon application of an impact force to the impact sensor, the inertia member presses the piezoelectric element with a stress corresponding to the impact force to thereby allow the piezoelectric element to generate a voltage corresponding to the applied stress.

According to this invention, in a case where three impact sensors each having the above construction are equiangularly disposed along the peripheral direction of the inertia member, each of the three piezoelectric elements which are radially disposed at a central angle of 120° is given a different stress by one inertia member, and a vector analysis is conducted on three kinds of output voltages which correspond to the three different stresses, whereby the impact strength and impact direction in the car clash can be determined.

The impact sensing device of this invention thus constructed may be connected to an analyzer having an electric circuit for storing an output or a detection result of the sensor.

The impact sensing device of this invention is connected to a device for receiving the output voltage of the piezoelectric element to judge as to whether the output voltage is larger than a predetermined threshold voltage, and outputting a signal for instructing inflation of the air bag when judging the output voltage to be larger than the predetermined threshold voltage.

According to the impact sensor of this invention, the following effects are obtained.

(1) Since the inertia member presses the piezoelectric member at all times, impact transmission in a car clash is made at a high speed. Therefore, a response time of the impact sensor is short.

(2) Since each of at least three piezoelectric elements which are radially disposed outputs a respective output voltage having an amplitude corresponding to its impact direction in every car clash, the direction and strength of the car clash can be accurately sensed. Therefore, there is no problem such as malfunction of an inflator.

(3) Since no movable portion is required, a high inherent frequency can be provided to the sensor.

(4) Since no movable portion is required, fatigue due to vibration is reduced, and any failure operation caused by abrasion and corrosion of the movable portion does not occur.

(5) Since there is no electric contact to be exposed to the air, any conductive failure caused by corrosion of the contact does not occur. Therefore, even when the impact sensor of this invention has been installed in a car for a long time, there is no possibility that the performance of the sensor is degraded. Accordingly, the impact sensor of this invention has remarkably excellent durability and high reliability.

(6) The sensor of this invention adopts a manner of converting an impact to variation of an electrical signal. Therefore, the impact, i.e., impact data, can be recorded on time basis.

(7) Since each of at least three piezoelectric elements which are radially disposed outputs a respective output voltage having an amplitude corresponding to its impact direction in every car clash, the direction and strength of the car clash can be accurately sensed. Therefore, the sensor of this invention may be used as a clash recording device.

PREFERRED EMBODIMENT OF THE INVENTION

Figure 1:
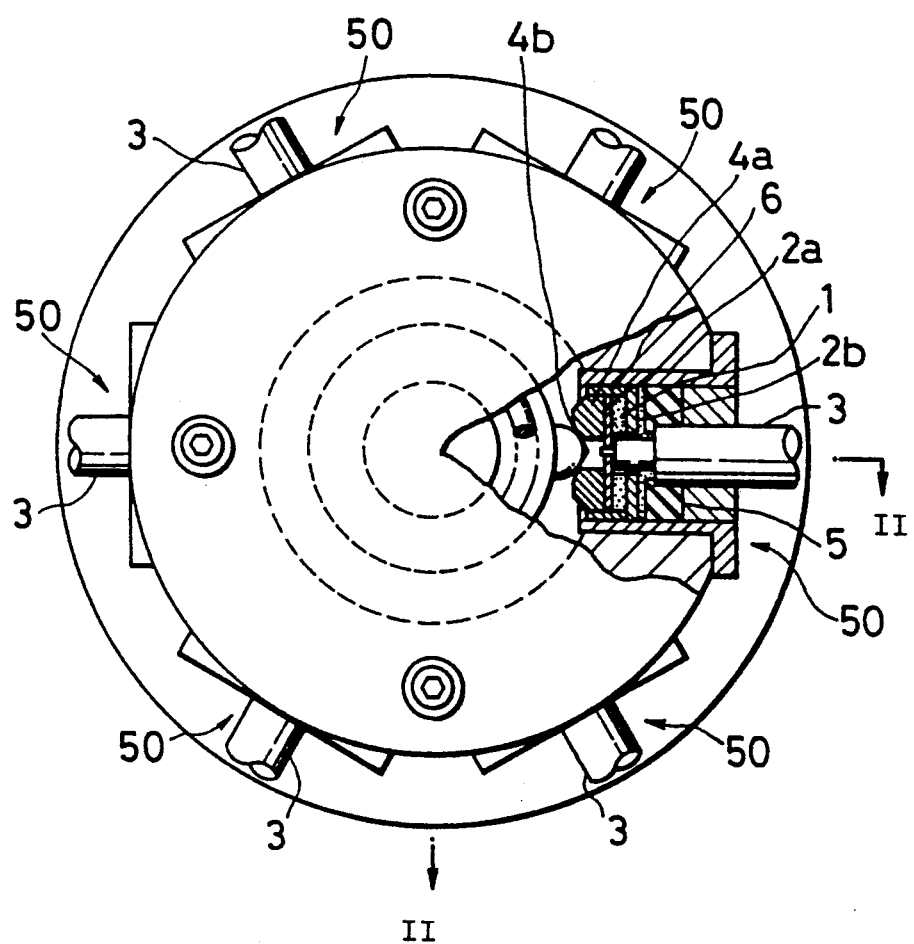
FIG. 1 is a plan cross-sectional view of an embodiment of an omnidirectional impact sensor according to this invention.
Figure 2:
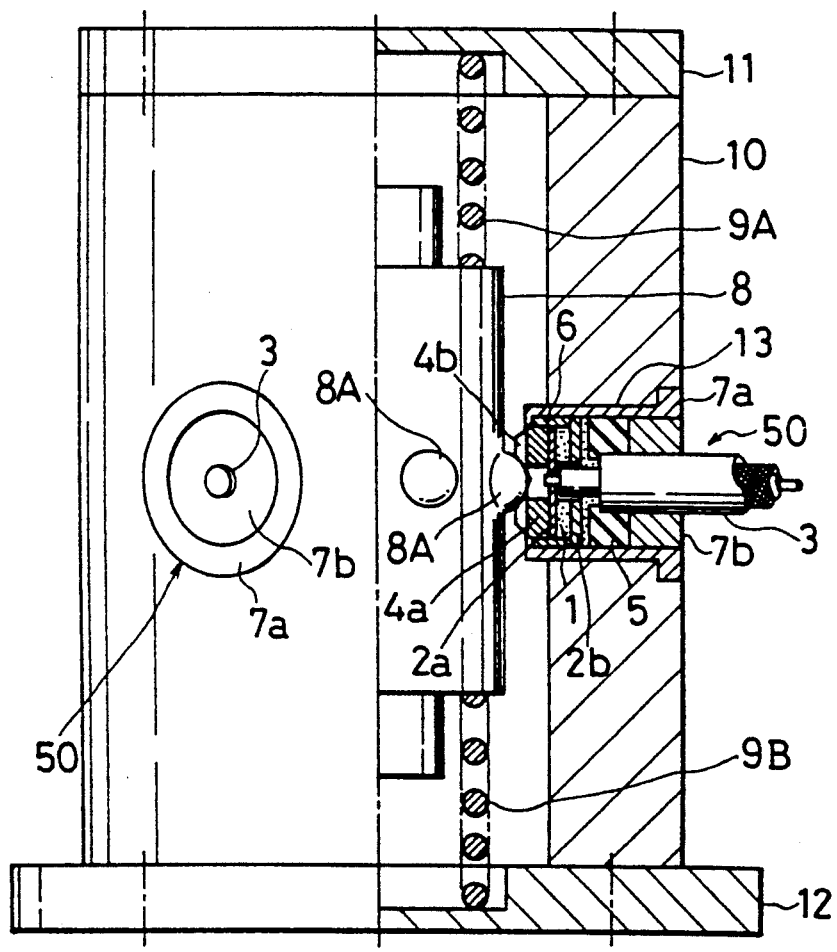
FIG. 2 is a longitudinal-sectional view taken along a line II—II in FIG. 1 and a side view of the omnidirectional impact sensor as shown in FIG. 1.
Figure 3:
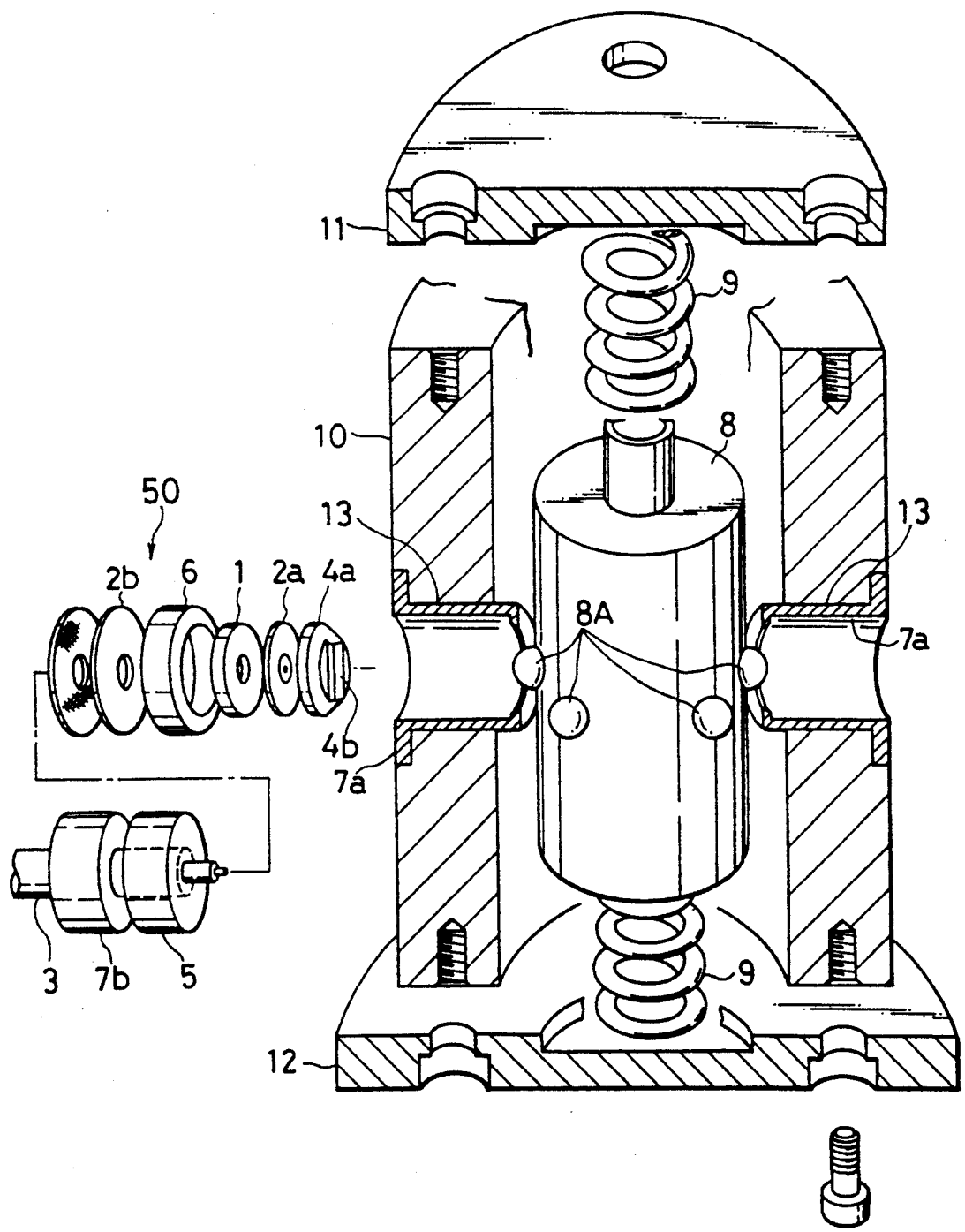
FIG. 3 is a perspective view of main parts constituting the omnidirectional impact sensor as shown in FIG. 1.

A preferred embodiment of this invention will be described with reference to FIGS. 1 to 3.

An impact sensing device of this embodiment includes a cylindrical housing 10 having an upper lid 11 and a bottom lid 12 which are bolted to both end portions of the housing 10, respectively. The housing 10 is disposed in such a manner that its center axis is in a vertical direction.

Six through holes 13 into which piezoelectric element/electrode accommodating cases 7a are insertable are equiangularly formed at each of hexa-sectional peripheral positions at a central angle of 60° on the side surface of the cylindrical housing 10, and each impact sensor 50 (a group of six impact sensors in total) as described below is inserted into each through hole 13. An inertia member 8 is disposed in an inner space of the housing 10 in such a manner as to be coaxial with the housing 10, and is suspensively supported at both of upper and lower portions thereof between the upper and bottom lids 11 and 12 of the housing 10 by two springs 9A and 9B. The inertia member 8 has a projection on each of the upper and lower surfaces thereof, and each of the springs 9A and 9B is wound around the projection at one end thereof. The inertia member 8 has a cylindrical shape, and a semispherical projection 8A is equiangularly provided at each of hexa-sectional peripheral positions on the side surface of the inertia member 8.

Each impact sensor 50 includes a piezoelectric element/electrode accommodating case 7a serving as an outer shell of the impact sensor 50. The case 7a of each impact sensor 50 is disposed so that a pressure-receiver 4a contacts the corresponding semispherical projection 8A of the inertia member 8 at one end portion thereof such that a slight pressing force is applied to the semispherical projection 8A.

An inwardly-projected flange portion is provided at the end of the piezoelectric element/electrode accommodating case 7a, and an insulating cylinder 6, a pressure-receiver 4a having a vertical groove 4b, a positive electrode plate 2a, a doughnut-shaped piezoelectric element 1, a doughnut-shaped negative electrode plate 2b, a cylindrical electrode press member 5 formed of synthetic rubber, an output cable 3 and a bottom lid 7b of the piezoelectric element/electrode accommodating case are accommodated within the case 7a in such a manner as to be engagedly supported by the flange.

One end of the output cable 3 is connected to the positive electrode plate 2a while the other end of the output cable 3 is connected to the negative electrode plate 2b. The piezoelectric element is so designed to generate a voltage having an amplitude proportional to a compressive force applied from an external, and piezoelectric ceramic material which supplies a stable output voltage is preferably used.

The pressure-receiver 4a has a ring shape, and its end portion is tapered so that one end surface of the pressure-receiver 4a, that is, at one end of the case 7a, has a small diameter. On the other hand, the other end surface of the pressure-receiver 4a which has a large diameter is a plane surface, and is in contact with the positive electrode plate 2a. In addition, the vertical groove 4b having a V-shaped or U-shaped section is continuously formed in a vertical direction on the tapered end surface of the pressure-receiver 4a. It is particularly important that the vertical groove 4b is formed so as to be extended in the vertical direction and the upper and lower ends of the vertical groove 4b are opened. A sensing accuracy to an impact in left and right directions is dependent on an intersecting angle between two planes which are formed at both sides of the vertical groove 4b.

The semispherical projection 8A is pressed against an inner side surface of the pressure-receiver 4a at all times with a slight stress which is applied by the cylindrical electrode press member 5 of synthetic rubber inserted between the negative electrode plate 2b in the piezoelectric element/electrode accommodating case 7a and the bottom lid 7b of the piezoelectric element/electrode accommodating case 7a in such a manner that the semispherical projection 8A is in a linear contact with the inner side surface of the pressure-receiver 4a. Through this urged contact, the piezoelectric element 1 is pressed with a constant pressure by the electrode press member 5, so that a constant voltage is outputted from the piezoelectric element 1.

The omnidirectional impact sensing device according to this invention is installed in a car body in such a manner that the axial direction of the housing 10 corresponds to the vertical direction. In this structure, it is most preferable that the axial direction of a pair of two piezoelectric element/electrode accommodating cases 7a among the six piezoelectric element/electrode accommodating cases 7a, which are disposed at just opposite positions to each other corresponds to a front-and-rear direction of the car body.

When a car having the impact sensing device as described above suffers a car clash, the inertia member 8 presses the piezoelectric elements with a stress corresponding to an impact strength due to the car clash, and the piezoelectric elements output voltages having amplitudes corresponding to the applied stress.

The output cables 3 which extend from the six impact sensors 50 respectively are connected to an inflator actuating circuit. The inflator actuating circuit contains six flip-flop circuits therein, and serves to compare six impact signals having different amplitudes which are outputted from the six impact sensors 50 in every car clash, to electrically calculate the impact strength and impact direction of the car clash using a vector analysis, to transmit an actuating signal to the inflator when the maximum voltage obtained through the above impact sensing operation is larger than a predetermined threshold voltage, and to store the detection result in an random access memory (RAM), for example. In response to the actuating signal, the inflator is actuated to allow gas to blow out and to inflate an air bag rapidly.

What is claimed is:

1. An impact sensing device comprising:
    springs;
    an inertia member having a cylindrical structure, upper and lower portions, and at least three semispherical projections disposed equiangularly on an outer peripheral surface thereof;
    a housing for accommodating said inertia member therein and having a cylindrical structure with a center axis, said cylindrical housing being disposed such that the center axis thereof is in a vertical direction and the cylindrical inertia member is coaxially retained therein and is suspensively supported at the upper and lower portions by the springs; and
    at least three impact sensors disposed in the housing to be equiangularly spaced apart from each other, number of said impact sensors being the same as that of the semispherical projections so that respective tip portions of the impact sensors are in contact with the corresponding semispherical projections, each impact sensor including a piezoelectric element for generating a voltage having an amplitude corresponding to an applied stress, and an urging member for urging the piezoelectric sensor against said inertia member so that upon application of an impact force to the impact sensor, said inertia member presses the piezoelectric element with a stress corresponding to the impact force to allow the piezoelectric element to generate a voltage having an amplitude corresponding to the applied impact force.

2. The impact sensing device as claimed in claim 1, wherein more than three semispherical projections and impact sensors are formed to surround the outer surface of the inertia member so that at least two impact sensors respond to the impact force applied to the impact sensing device.

3. The impact sensing device as claimed in claim 1, wherein each of said impact sensors has a groove of one of V-shaped and U-shaped section on a tip surface thereof, said groove extending in an up-and-down direction, and each of said projections is in engagement with said groove.

4. The impact sensing device as claimed in claim 1, wherein each of said impact sensors further includes an output cable for guiding out the voltage therethrough.

5. The impact sensing device as claimed in claim 1, wherein said piezoelectric element comprises piezoelectric ceramic material.

* * * * *